US010623076B2

(12) United States Patent
Onishi et al.

(10) Patent No.: US 10,623,076 B2
(45) Date of Patent: Apr. 14, 2020

(54) MAIN BEAM DIRECTION DETERMINING DEVICE, HEAD-MOUNTED DISPLAY, MAIN BEAM DIRECTION DETERMINING METHOD, AND PROGRAM

(71) Applicant: Sony Interactive Entertainment Inc., Tokyo (JP)

(72) Inventors: Katsuyoshi Onishi, Tokyo (JP); Issei Chigusa, Tokyo (JP); Kazuo Miura, Kanagawa (JP); Tatsuto Suetomi, Chiba (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 15/763,632

(22) PCT Filed: Nov. 8, 2016

(86) PCT No.: PCT/JP2016/083133
§ 371 (c)(1),
(2) Date: Mar. 27, 2018

(87) PCT Pub. No.: WO2017/082256
PCT Pub. Date: May 18, 2017

(65) Prior Publication Data
US 2018/0287679 A1    Oct. 4, 2018

(30) Foreign Application Priority Data
Nov. 9, 2015    (JP) .................................. 2015-219586

(51) Int. Cl.
*H04B 7/06*    (2006.01)
*H04B 7/10*    (2017.01)
(Continued)

(52) U.S. Cl.
CPC ......... *H04B 7/0617* (2013.01); *A63F 13/235* (2014.09); *A63F 13/25* (2014.09);
(Continued)

(58) Field of Classification Search
CPC .. H04B 7/0617; H04B 7/0695; H04B 7/0456; H04B 7/0413; H04B 7/0626;
(Continued)

(56) References Cited

U.S. PATENT DOCUMENTS 9,515,372 B2    12/2016  Chang
2007/0253386 A1*  11/2007  Li ........................ H04L 1/0026
                                                    370/338
(Continued)

FOREIGN PATENT DOCUMENTS

JP    11008893 A    1/1999
JP    2014525191 A    9/2014
(Continued)

OTHER PUBLICATIONS

International Preliminary report on Patentability and Written Opinion for corresponding PCT Application No. PCT/JP2016/083133, 9 pages, dated May 24, 2018.
(Continued)

*Primary Examiner* — David C Payne
*Assistant Examiner* — Sarah Hassan
(74) *Attorney, Agent, or Firm* — Matthew B. Dernier, Esq.

(57) ABSTRACT

There are provided a main beam direction determining device, a main beam direction determining method, and a program each of which is capable of shortening a time required for determination of a main beam direction of a head-mounted display. A secondary candidate sector selecting portion selects a part of a plurality of primary candidates as secondary candidates in response to a posture of an HMD.
(Continued)

A sector level sweep processing executing portion determines a main beam direction of the HMD based on communication qualities when communications by the respective secondary candidates are performed from the secondary candidates.

5 Claims, 9 Drawing Sheets

(51) Int. Cl.
    *A63F 13/5255*     (2014.01)
    *A63F 13/235*     (2014.01)
    *A63F 13/26*     (2014.01)
    *H04B 7/08*     (2006.01)
    *A63F 13/25*     (2014.01)
    *G02B 27/01*     (2006.01)

(52) U.S. Cl.
    CPC .......... *A63F 13/26* (2014.09); *A63F 13/5255* (2014.09); *H04B 7/0695* (2013.01); *H04B 7/0802* (2013.01); *H04B 7/088* (2013.01); *H04B 7/10* (2013.01); *G02B 27/0176* (2013.01)

(58) Field of Classification Search
    CPC .... H04B 7/0417; H04B 7/088; H04B 17/318; H04B 7/063; H04B 7/0634
    USPC ........................................... 375/260; 359/567
    See application file for complete search history.

(56) References Cited

U.S. PATENT DOCUMENTS

| | | |
|---|---|---|
| 2010/0330940 A1 | 12/2010 | Sheynblat |
| 2011/0242635 A1* | 10/2011 | Oka .................. G02B 27/0172 359/207.7 |
| 2013/0017836 A1 | 1/2013 | Chang |
| 2014/0254515 A1 | 9/2014 | Kim |
| 2015/0138017 A1 | 5/2015 | Jo |
| 2016/0361658 A1* | 12/2016 | Osman .................... A63F 13/86 |
| 2017/0045941 A1* | 2/2017 | Tokubo ................... G06F 3/167 |
| 2017/0104517 A1 | 4/2017 | Kakishima |

FOREIGN PATENT DOCUMENTS

| | | |
|---|---|---|
| JP | 2015185953 A | 10/2015 |
| WO | 2015141066 A1 | 9/2015 |

OTHER PUBLICATIONS

International Search report for corresponding PCT Application No. PCT/JP2016/083133, 2 pages, dated Jan. 31, 2017.
Supplementary European Search Report for corresponding EP Application No. 16864217, 10 pages, dated May 9, 2019.

* cited by examiner

| | | φ | θ |
|---|---|---|---|
| (A) |  | 0 | +90 |
| (B) |  | −90 | +90 |
| (C) |  | −180 | +90 |
| (D) |  | +90 | +90 |

FIG.7

| PRIMARY CANDIDATE SECTOR ID | MAIN BEAM ANGLE PARAMETER ($\phi, \theta$) |
|---|---|
| 1 | (−180,+67.5) |
| 2 | (−180,+90) |
| 3 | (−180,+112.5) |
| 4 | (−157.5,+67.5) |
| 5 | (−157.5,+90) |
| 6 | (−157.5,+112.5) |
| 7 | (−135,+67.5) |
| 8 | (−135,+90) |
| 9 | (−135,+112.5) |
| 10 | (−112.5,+67.5) |
| 11 | (−112.5,+90) |
| 12 | (−112.5,+112.5) |
| 45 | (+135,+112.5) |
| 46 | (+157.5,+67.5) |
| 47 | (+157.5,+90) |
| 48 | (+157.5,+112.5) |

MAIN BEAM DIRECTION DETERMINING DEVICE, HEAD-MOUNTED DISPLAY, MAIN BEAM DIRECTION DETERMINING METHOD, AND PROGRAM

TECHNICAL FIELD

The present invention relates to a main beam direction determining device, a head-mounted display, a main beam direction determining method, and a program.

BACKGROUND ART

A technique for determining a direction in which a high communication quality is obtained when a communication was carried out as a main beam direction from a plurality of candidates for the main beam direction is known in a wireless communication field. An example of such a technique includes sector level sweep in beam forming.

SUMMARY

Technical Problem

In recent years, for example, it has been studied that a moving image, representing a play situation of a game, which a game apparatus for executing a game program produces is wirelessly transmitted to a head-mounted display (HMD), and the HMD is caused to display the moving image concerned. By adopting this technique, a user who mounts thereto the HMD can play a game by freely moving his/her head mounted with the HMD.

For example, in a situation in which a user mounting thereto the HMD moves his/her head, thereby being able to carry out an operation input, or the like, the direction of the head of the user frequently changes. Then, this situation leads to that a direction of an antenna built in the HMD also frequently changes. In such a case, it is necessary to quickly change a main beam direction of the HMD by, for example, the beam forming described above in response to the change in direction of the antenna. Here, for quickly changing the main beam direction of the HMD in response to the change in direction of the antenna, it becomes especially important to shorten a time required for determining the main beam direction of the HMD.

The present invention has been made in the light of the actual situation described above, and one of objects thereof is to provide a main beam direction determining device, a main beam direction determining method, and a program each of which is capable of shortening a time required for determining a main beam direction of a head-mounted display.

Solution to Problem

In order to solve the problem described above, a main beam direction determining device according to the present invention for determining a main beam direction of a head-mounted display from a plurality of primary candidates of a main beam direction includes a selection portion, and a main beam direction determining portion. The selection portion selects a part of the plurality of primary candidates as secondary candidates in response to a posture of the head-mounted display. The main beam direction determining portion determines the main beam direction of the head-mounted display based on communication qualities when communications by the respective secondary candidates are carried out from the secondary candidates.

In an aspect of the present invention, the main beam direction determining device further includes a posture specifying portion. The posture specifying portion specifies the posture of the head-mounted display based on a detection result of a sensor with which the head-mounted display is provided. The selection portion selects the part of the plurality of primary candidates as the secondary candidates in response to the posture specified by the posture specifying portion.

In addition, in an aspect of the present invention, the primary candidates are made to correspond to angles with respect to a direction of a reference. The selection portion selects the primary candidates in which the angles made to correspond thereto fall within an angle responding to the posture of the head-mounted display as the second candidates.

In addition, a head-mounted display according to the present invention for determining a main beam direction of the head-mounted display from a plurality of primary candidates of the main beam direction includes a selection portion and a main beam direction determining portion. The selection portion selects a part of the plurality of primary candidates as secondary candidates in response to a posture of the head-mounted display. The main beam direction determining portion determines the main beam direction of the head-mounted display based on communication qualities when communications by the respective secondary candidates are carried out from the secondary candidates.

In addition, a main beam direction determining method according to the present invention of determining a main beam direction of a head-mounted display from a plurality of primary candidates of the main beam direction includes a step of selecting a part of a plurality of primary candidates as secondary candidates in response to a posture of the head-mounted display, and a step of determining the main beam direction of the head-mounted display based on communication qualities when communications by the respective secondary candidates are carried out from the secondary candidates.

In addition, a program according to the present invention causes a computer for determining a main beam direction of a head-mounted display from a plurality of primary candidates of the main beam direction to carry out a procedure for selecting a part of a plurality of primary candidates as secondary candidates in response to a posture of the head-mounted display, and a procedure for determining the main beam direction of the head-mounted display based on communication qualities when communications by the respective secondary candidates are carried out from the secondary candidates.

BRIEF DESCRIPTION OF DRAWINGS

FIG. 7 is a diagram depicting an example of primary candidate sector data.

DESCRIPTION OF EMBODIMENT

Hereinafter, an embodiment of the present invention will be described with reference to the drawings.

Figure 1:
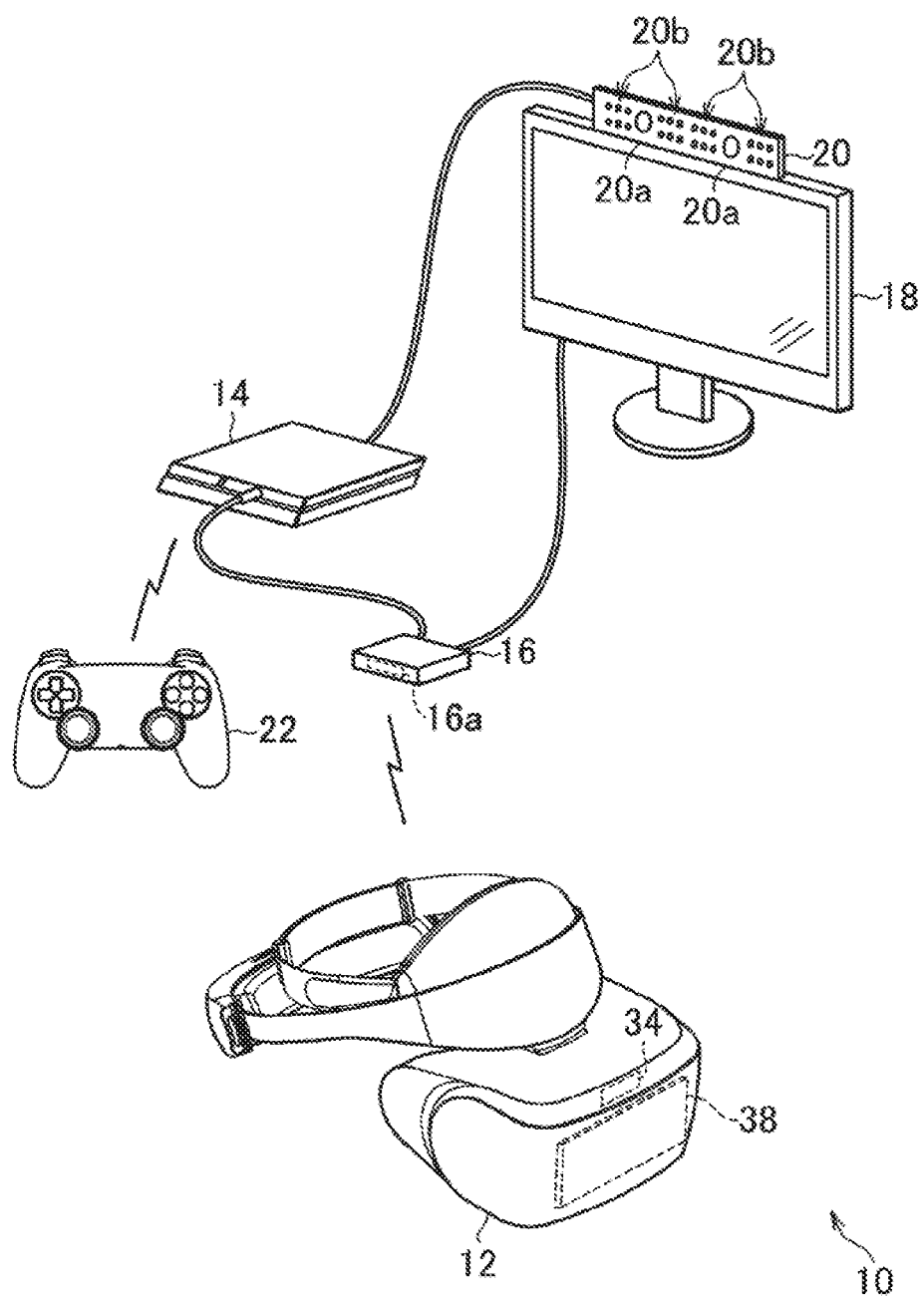
FIG. 1 is a view depicting an example of an entire configuration of a graphic display system according to an embodiment of the present invention.
Figure 2:
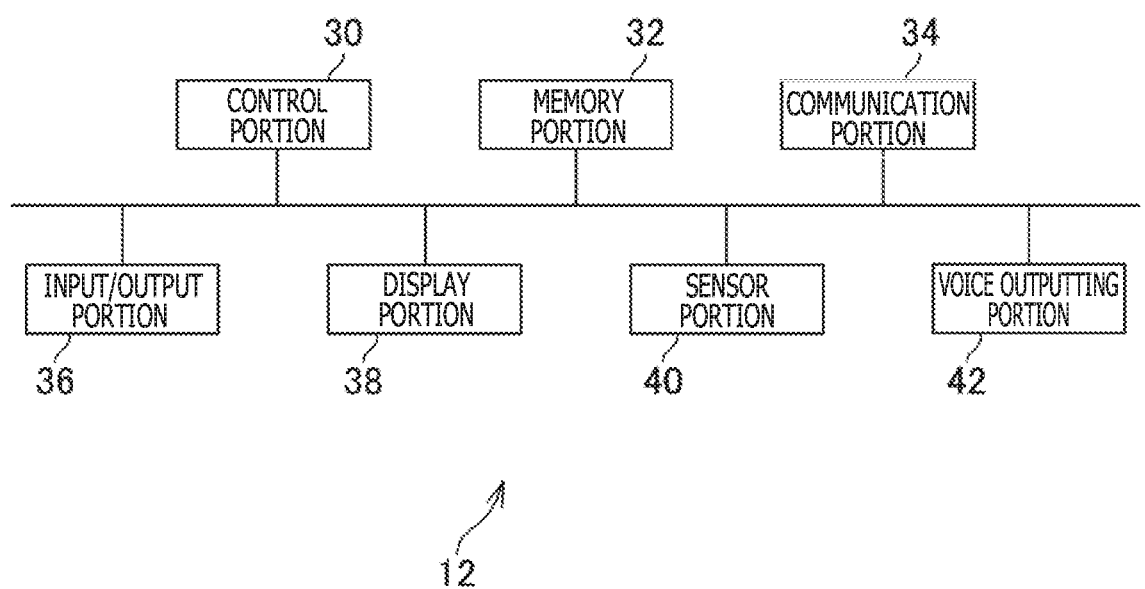
FIG. 2 is a block diagram depicting an example of a configuration of a head-mounted display according to the embodiment of the present invention.

FIG. 1 is a view depicting an example of an entire configuration of a graphic display system 10 according to an embodiment of the present invention. FIG. 2 is a block diagram depicting an example of a configuration of a head-mounted display (HMD) according to the present embodiment.

As depicted in FIG. 1, the graphic display system 10 according to the present embodiment includes an HMD 12, an entertainment device 14, a relay device 16, a display 18, a camera microphone unit 20, and a controller 22.

For example, as depicted in FIG. 2, a control portion 30, a memory portion 32, a communication portion 34, an input/output (I/O) portion 36, a display portion 38, a sensor portion 40, and a voice outputting portion 42 are included in the HMD 12 according to the present embodiment.

The control portion 30, for example, is a program-controlled device, such as a micro-processor, which operates in accordance with a program installed in the HMD 12.

The memory portion 32, for example, is a memory element such as a read-only memory (ROM), a random access memory (RAM) or the like. A program and the like which are executed by the control portion 30 are stored in the memory portion 32.

The communication portion 34, for example, is a communication interface such as a wireless local area network (LAN) module, in which an array antenna is built. In the present embodiment, as depicted in FIG. 1, the communication portion 34 is disposed upward on a front side of the HMD 12.

The I/O portion 36, for example, is an I/O port such as a high-definition multimedia interface (HDMI) (registered trademark) port, a universal serial bus (USB) port, or an auxiliary (AUX) port.

The display portion 38, for example, is a display, such as a liquid crystal display or an organic electroluminescence (EL) display, which is disposed on a front side of the HMD 12 and displays thereon an image or the like which is produced by the entertainment device 14. In addition, the display portion 38 is accommodated in a chassis of the HMD 12. The display portion 38, for example, may receive a video signal which is outputted by the entertainment device 14 and is relayed by the relay device 16, and outputs an image represented by the video signal concerned. The display portion 38 of the present embodiment, for example, can display a three-dimensional image by displaying an image for a left eye, and an image for a right eye. It should be noted that the display portion 38 may be one which is unable to display a three-dimensional image, but is able to display thereon only a two-dimensional image.

The sensor portion 40, for example, is a sensor such as an acceleration sensor or a motion sensor. The sensor portion 40 outputs a measurement result of a rotation amount, a movement amount, and the like of the HMD 12 to the control portion 30 at a predetermined frame rate.

The voice outputting portion 42, for example, is a headphone, a speaker or the like, and outputs a voice and the like which are represented by voice data produced by the entertainment device 14. The voice outputting portion 42, for example, receives a voice signal which is outputted by the entertainment device 14 and relayed by the relay device 16, and outputs the voice represented by the voice signal concerned.

The entertainment device 14 according to the present embodiment, for example, is a computer such as a game console, a digital versatile disk (DVD) player, or a Blu-ray (registered trademark) player. The entertainment device 14 according to the present embodiment, for example, produces an image and a voice through the execution of a game program stored, the reproduction of contents recorded in the optical disc. Then, the entertainment device 14 according to the present embodiment, for example, outputs the video signal representing the image to be produced, and the voice signal representing the voice to be reproduced to the HMD 12 and the display 18 via the relay device 16.

The relay device 16 according to the present embodiment is a computer which relays the video signal and the voice signal outputted from the entertainment device 14, and outputs the video signal and the voice signal to the HMD 12 and the display 18. The relay device 16 according to the present embodiment includes a communication portion 16a as a communication interface such as a wireless LAN module in which an array antenna is built.

The display 18 according to the present embodiment, for example, is a liquid crystal display or the like, and displays thereon the image or the like represented by the video signal outputted from the entertainment device 14.

The camera microphone unit 20 according to the present embodiment, for example, includes a camera 20a which outputs an image obtained by the imaging a subject to the entertainment device 14, and a microphone 20b which acquires a voice of circumstances, converts the voice concerned into voice data, and outputs the resulting the voice data to the entertainment device 14. In addition, the camera 20a according to the present embodiment is a stereo camera.

The HMD 12 and the relay device 16, for example, can transmit and receive data to and from each other through a wireless communication. The entertainment device 14 and the relay device 16, for example, are connected to each other through an HDMI cable or a USB cable. The relay device 16 and the display 18, for example, are connected to each other through an HDMI cable or the like. The entertainment device 14 and the camera unit 20, for example, are connected to each other through an AUX cable or the like.

The controller 22 according to the present embodiment is an operation input device for carrying out an operation input to the entertainment device 14. A user can carry out various kinds of operation inputs by using the controller 22 by depressing a direction key or button with which the controller 22 is provided, or the inclining an operation stick. Then, in the present embodiment, the controller 22 outputs input data made to correspond to the operation input to the entertainment device 14. In addition, the controller 22 according to the present embodiment is provided with a USB port. Then, the controller 22 is connected to the entertainment device 14 by the USB cable, thereby enabling the input data to be outputted to the entertainment device 14 in a wired manner. In addition, the controller 22 according to the present embodiment is provided with a wireless communication module or the like, and thus can wirelessly output the input data to the entertainment device 14.

In the present embodiment, a wireless communication by a millimeter wave in a 60-GHz band or the like is carried out between the HMD 12 and the relay device 16. Since the millimeter wave is strong in straightness, the communication quality is difficult to secure if the main beam direction is not suitably adjusted. In the present embodiment, the adjustment is carried out in such a way that the direction in which the communication quality is higher is set as the main beam direction, thereby securing the communication quality.

Beam forming is known as an example of a technique for setting the main beam direction. The processing for the beam forming is constituted by processing of sector level sweep, and processing of beam refinement. In the sector level sweep, a direction in which the communication quality is higher when the communication is carried out is determined as the main beam direction of the HMD 12 from a plurality of candidates of the main beam direction. The communication quality in the present embodiment, for example, includes a signal-to-noise ratio (S/N ratio), reception intensity, and the like. When the main beam direction of the HMD 12 is determined by the sector level sweep, processing of the beam refinement for finely adjusting the main beam direction thus determined of the HMD 12 is executed. It should be noted that not only the sector level sweep, but also the beam refinement is carried out through the communication (negotiation) between the communication portion 34 of the HMD 12, and the communication portion 16a of the relay device 16.

Figure 3:
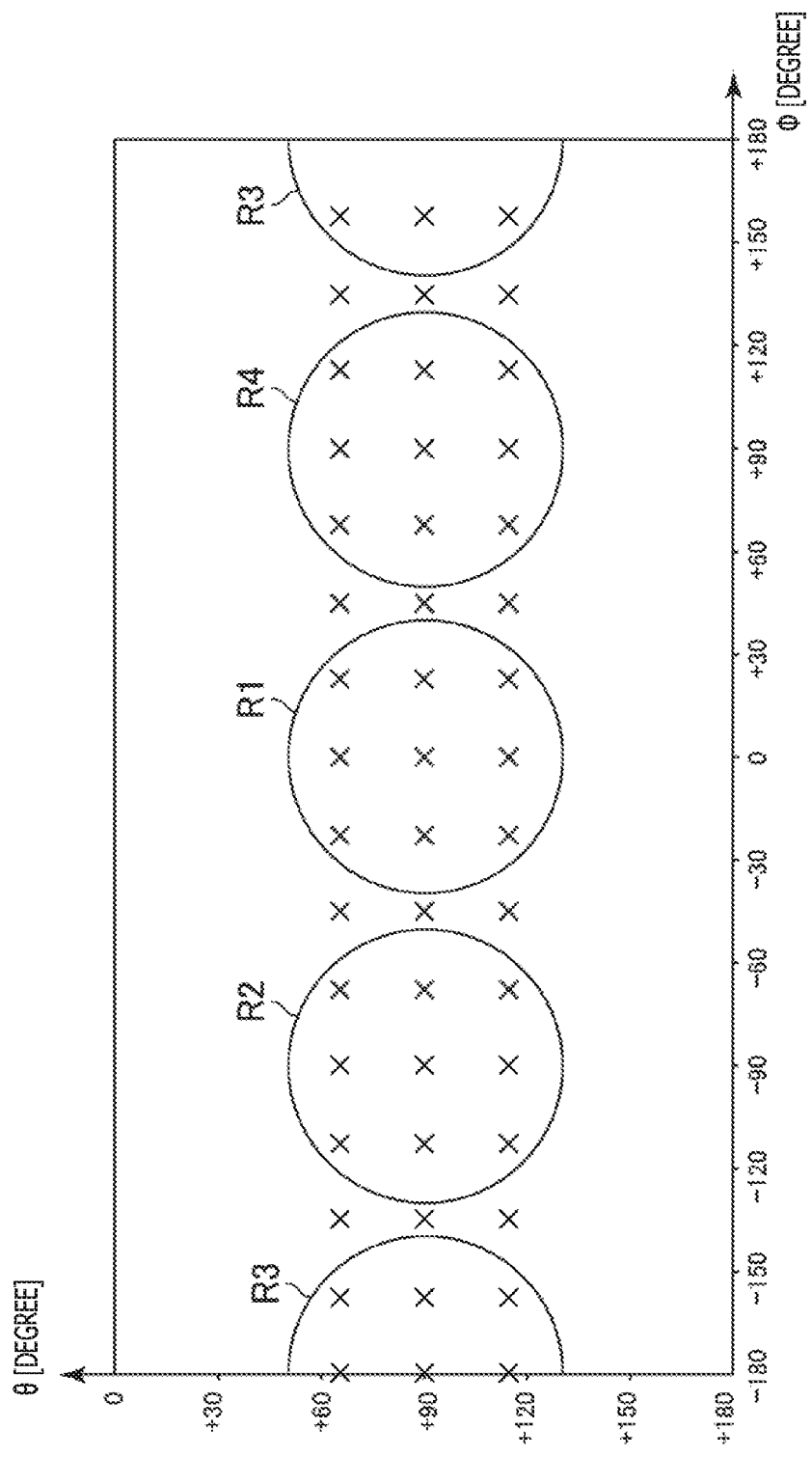
FIG. 3 is a sector candidate view schematically depicting an example of a plurality of candidates of a main beam direction in sector level sweep.
Figure 4:
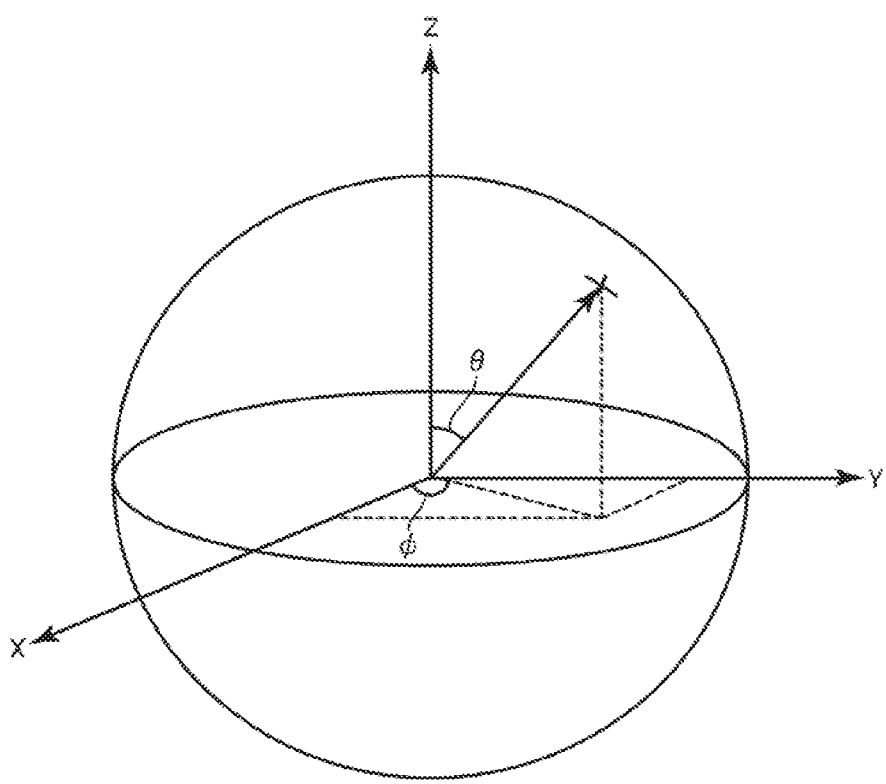
FIG. 4 is an explanatory view explaining an example of a correspondence relationship between a combination of an angle ϕ and an angle θ in the sector candidate view, and a main beam direction.

FIG. 3 is a sector candidate view schematically depicting an example of a plurality of candidates of the main beam direction in the sector level sweep. FIG. 4 is an explanatory view explaining an example of a correspondence relationship between a combination of an angle $\phi$ and an angle $\theta$ in the sector candidate view depicted in FIG. 3, and the main beam direction.

Points each indicated by a mark x in the sector candidate view depicted in FIG. 3 represent the candidates of the main beam direction in the sector level sweep. Hereinafter, the candidates concerned will be referred to as primary candidate sectors. In the example of FIG. 3, 48 primary candidate sectors are set. Then, these primary candidate sectors are individually made to correspond to combinations of the angles $\phi$ and the angles $\theta$. Hereinafter, the combinations of the angle $\phi$ and the angle $\theta$ will be referred to as beam angle parameters ($\phi$, $\theta$).

In the present embodiment, for example, a direction vertical to a surface on which the array antenna built in the HMD 12 is disposed, that is, a direction from the back of the head of the user mounting thereto the HMD 12 toward the front of the head of the user mounting thereto the HMD 12 shall correspond to an X-axis positive direction in FIG. 4. In addition, a direction along the surface on which the array antenna built in the HMD 12 is disposed, that is, a direction from the right side head toward the left side head of the user mounting thereto the HMD 12 shall correspond to a Y-axis positive direction in FIG. 4. In addition, a direction along the surface on which the array antenna built in the HMD 12 is disposed, that is, a direction which is obtained by rotating counterclockwise the Y-axis positive direction by 90 degrees when viewed from the X-axis positive direction shall be a Z-axis positive direction. Then, in the present embodiment, as depicted in FIG. 4, an angle in which the counterclockwise direction is set positive with an X-axis as a reference when viewed from the Z-axis positive direction is set as an angle $\phi$. In addition, an angle made with the Z-axis positive direction is set as an angle $\theta$. For example, main beam angle parameters ($\phi$, $\theta$) corresponding to the X-axis positive direction become (0, +90). It should be noted that in the present embodiment, the unit of values of the main beam angle parameters shall be set as "degree." In addition, in the present embodiment, $-180 \leq \phi < +180$, and $0 \leq \theta \leq 180$ are established.

In the past sector level sweep, the negotiation between the HMD 12 and the relay device 16 was carried out. Then, in the negotiation concerned, there were confirmed the communication qualities when the communications were carried out in which with respect to all the 48 primary candidate sectors disposed in the sector candidate view, the directions made to correspond to the respective primary candidate sectors were set as the main beam directions. Then, the direction which was made to correspond to the primary candidate sector showing the highest communication quality was determined as the main beam direction.

On the other hand, in the present embodiment, of the 48 primary candidate sectors disposed in the sector candidate view depicted in FIG. 3, a part thereof responding to a posture of the HMD 12 is selected as the secondary candidate sectors. During the selection of the secondary candidate sectors, the communication (negotiation) between the HMD 12 and the relay device 16 is unnecessary. FIG. 3 depicts four narrowing areas R (R1 to R4) as boundaries as to whether or not the candidate corresponds to the secondary candidate sector. Each of the shapes of the areas R1, R2, and R4, in the present embodiment, for example, is a circle with a predetermined length as a radius. Incidentally, the area R3 is separated into a semicircle area with a point in which the main beam angle parameters ($\phi$, $\theta$) are (−180, +90) as a center, and a semicircle area with a point in which the main beam angle parameters ($\phi$, $\theta$) are (+180, +90) as a center. One narrowing area R may be separately disposed in the sector candidate view in such a way. In addition, in the example of FIG. 3, a radius of the narrowing area R has a length corresponding to 40 degrees. Then, when, for example, the front surface of the HMD 12 faces the relay device 16, the nine primary candidate sectors disposed within the area R1 depicted in FIG. 3 are selected as the secondary candidate sectors. Then, the communication quality when the communications with the directions individually made to correspond to the selected secondary candidate sectors as the main beam directions are carried out is confirmed by the negotiation between the HMD 12 and the relay device 16. Then, the direction made to correspond to the secondary candidate sector showing the highest communication quality shall be determined as the main beam direction.

Since the HMD 12 according to the present embodiment is provided with the sensor portion 40, the posture of the HMD 12 can be specified based on a detection result of the sensor portion 40. The posture of the HMD 12 is specified in such a way, thereby enabling the direction of the relay device 16 as a party of the communication when viewed from the HMD 12 to be specified. In the present embodiment, the candidates of the main beam direction the communication qualities of which are confirmed in the manner as described above are limited to a part of the candidates responding to the posture of the HMD 12, for example, the candidates which are close to the relay device 16 when viewed from the HMD 12. For this reason, in the present embodiment, the number of sectors the communication qualities of which are confirmed by the negotiation between the HMD 12 and the relay device 16 is less than that in the case of the past beam forming. For this reason, according to the present embodiment, the main beam direction shall be specified for a shorter time than that in the case of the past beam forming.

Figure 5:
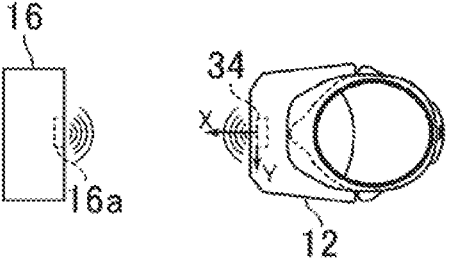
FIG. 5 is a view depicting an example of a relationship among a posture of the head-mounted display, the main beam direction, and main beam angle parameters.
Figure 5:
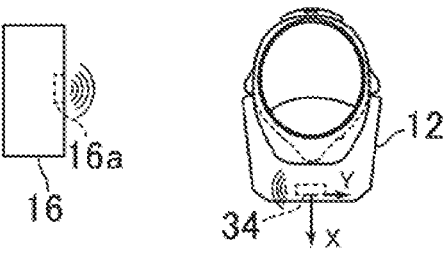
Figure 5:
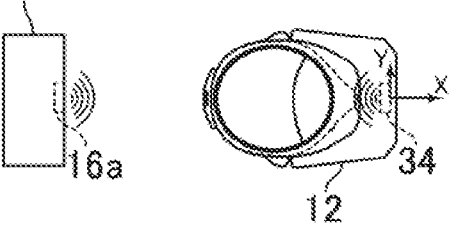
Figure 5:
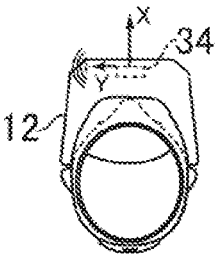

Hereinafter, the specification of the narrowing areas R based on the posture of the HMD 12 will be further described with reference to FIG. 5. FIG. 5 is a view depicting an example of a relationship among the posture of the HMD 12, the main beam direction, and the main beam angle parameters.

In the present embodiment, it is supposed that in the initial setting, the user mounting thereto the HMD 12 faces the horizontal direction, and also faces the relay device 16 as the party of the communication (refer to (A) of FIG. 5). In this case, the direction from the HMD 12 toward the relay device 16 corresponds to the X-axis positive direction described above. Then, the horizontal direction as the left side from the HMD 12 toward the relay device 16 corresponds to the Y-axis positive direction described above. Then, the vertical upward direction corresponds to the Z-axis positive direction described above. For this reason, the possibility that the communication quality is high in the direction (for example, the angle made with the X-axis positive direction is equal to or smaller than 40 degrees) within a range of a predetermined angle with the X-axis positive direction as a center. Then, in the present embodiment, in this case, the circular area R1 in which a radius has a length corresponding to a predetermined angle (40 degrees in this case) with a point having the main beam angle parameters ($\phi$, $\theta$)=(0, +90) in the sector candidate view as a center shall be specified as the narrowing area R.

In addition, when the user directs his/her head to the left side by 90 degrees from the state of (A) of FIG. 5, the direction from the HMD 12 toward the relay device 16 corresponds to the Y-axis negative direction described above (refer to (B) of FIG. 5). For this reason, in this case, a circular area R2 in which a radius has a length corresponding to 40 degrees with a point having the main beam angle parameters ($\phi$, $\theta$)=(−90, +90) in the sector candidate view as a center shall be specified as the narrowing area R.

In addition, when the user further directs his/her head to the left side by 90 degrees from the state of (B) of FIG. 5, the direction from the HMD 12 toward the relay device 16 corresponds to the X-axis negative direction described above (refer to (C) of FIG. 5). For this reason, in this case, a circular area R3 in which a radius has a length corresponding to 40 degrees with a point having the main beam angle parameters ($\phi$, $\theta$)=(−180, +90) in the sector candidate view as a center shall be specified as the narrowing area R.

In addition, when the user directs his/her head to the right side by 90 degrees from the state of (A) of FIG. 5, the direction from the HMD 12 toward the relay device 16 corresponds to the Y-axis positive direction described above (refer to (D) of FIG. 5). For this reason, in this case, a circular area R4 in which a radius has a length corresponding to 40 degrees with a point having the main beam angle parameters ($\phi$, $\theta$)=(+90, +90) in the sector candidate view as a center shall be specified as the narrowing area R.

In the present embodiment, the specification of the narrowing area R responding to the posture of the HMD 12 is carried out in the manner as described above.

Hereinafter, functions of the HMD 12 according to the present embodiment, and processing executed in the HMD 12 according to the present embodiment will be further described. It should be noted that the HMD 12 according to the present embodiment shall play a role as the main beam determining device for determining the main beam direction of the HMD 12 from a plurality of primary candidates of the main beam direction.

Figure 6:
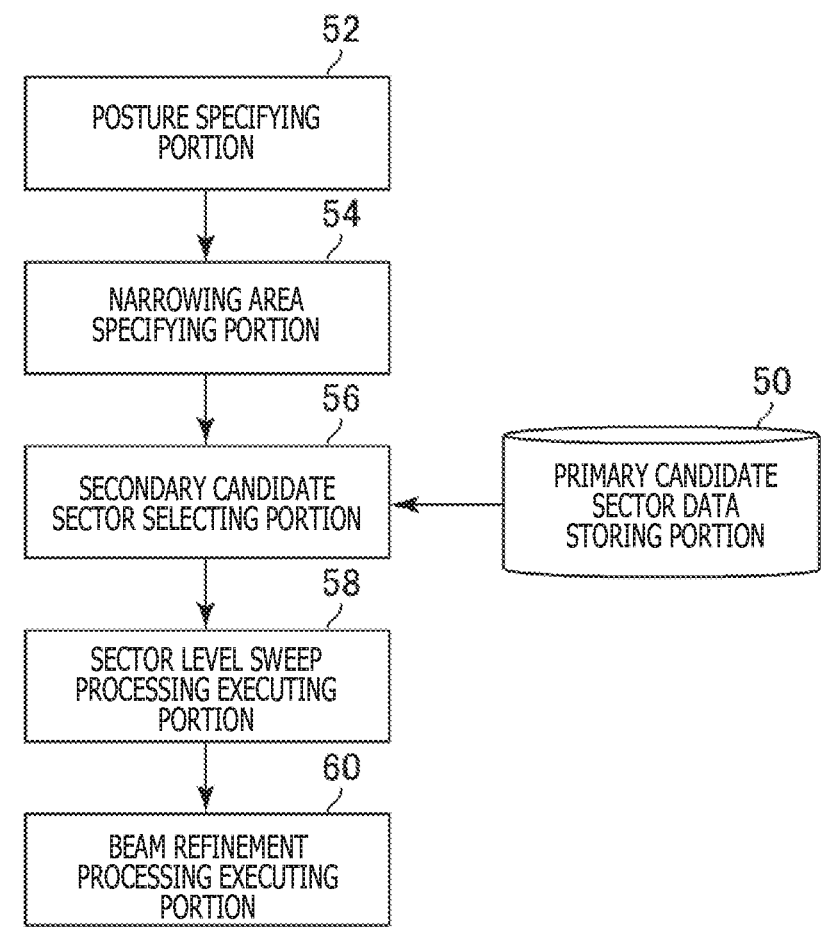
FIG. 6 is a functional block diagram depicting an example of functions which are mounted to the head-mounted display according to the embodiment of the present invention.

FIG. 6 is a functional block diagram depicting an example of functions mounted to the HMD 12 according to the present embodiment. It should be noted that all the functions depicted in FIG. 6 do not need to be mounted to the HMD 12 according to the present embodiment, and any of functions other than the functions depicted in FIG. 6 may be mounted thereto.

As depicted in FIG. 6, the HMD 12 according to the present embodiment, in terms of the function, for example, includes a primary candidate sector data storing portion 50, a posture specifying portion 52, a narrowing area specifying portion 54, a secondary candidate sector selecting portion 56, a sector level sweep processing executing portion 58, and a beam refinement processing executing portion 60. The primary candidate sector data storing portion 50 is mainly mounted as the memory portion 32. The posture specifying portion 52 is mainly mounted as the control portion 30 and the sensor portion 40. The narrowing area specifying portion 54 and the secondary candidate sector selecting portion 56 are mainly mounted as the control portion 30. The sector level sweep processing executing portion 58 and the beam refinement processing executing portion 60 are mainly mounted as the control portion 30 and the communication portion 34.

The control portion 30 may execute a program which contains commands corresponding to the above functions and is installed in the HMD 12 as the computer, and thereby the functions described above may be mounted. The program, for example, is supplied to the HMD 12 through a computer-readable information storage medium such as an optical disc, a magnetic disc, a magnetic tape, a magneto-optical disc, or a flash memory, or through the Internet.

The primary candidate sector data storing portion 50, in the present embodiment, for example, stores therein the primary candidate sector data exhibiting the primary candidate sectors. A primary candidate sector identification (ID) as the identification information on the primary candidate sector data, and the main beam angle parameters ($\phi$, $\theta$) described above, for example, as depicted in FIG. 7, are contained in the primary candidate sector data according to the present embodiment. In addition, in the present embodiment, the primary candidate sector data storing portion 50, as depicted in FIG. 7, stores therein a plurality of pieces of primary candidate sector data. In addition, the primary candidate sectors exhibited by the primary candidate sector data are made to correspond to angles with respect to the direction (for example, the X-axis positive direction) as a reference by the main beam angle parameters ($\phi$, $\theta$).

The posture specifying portion 52, in the present embodiment, for example, specifies the posture of the HMD 12. The posture specifying portion 52, for example, specifies the posture of the HMD 12 based on the detection result of the sensor portion 40. In addition, in the present embodiment, for example, the posture specifying portion 52 shall hold therein the posture parameters exhibiting the posture of the HMD 12. Incidentally, the posture specifying portion 52, for example, may add a value exhibiting a difference from the time of specification of the last posture up to the time of specification of the current posture to the values of the posture parameters held by the posture specifying portion 52, thereby carrying out the update in such a way that the values of the posture parameters become values exhibiting the newest posture of the HMD 12.

Figure 8A:
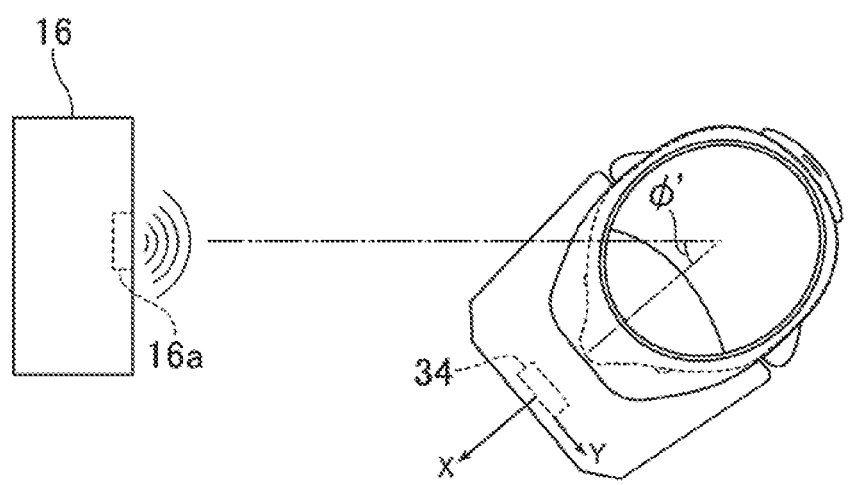
FIG. 8A is a view depicting an example of an angle ϕ'.
Figure 8B:
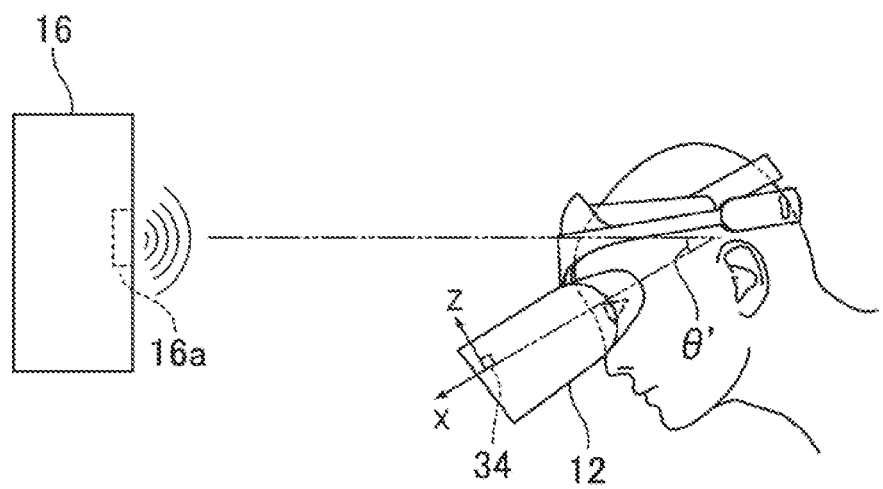
FIG. 8B is a view depicting an example of an angle θ'.

In the present embodiment, the posture parameters shall be expressed by posture angle parameters ($\phi'$, $\theta'$) as a combination of an angle $\phi'$ and an angle $\theta'$. In addition, in the present embodiment, the unit of the values of the posture angle parameters shall be "degree." FIG. 8A is a view depicting an example of the angle $\phi'$. FIG. 8B is a view depicting an example of the angle $\theta'$. It should be noted that in the following description, an initial state shall mean the state depicted in (A) of FIG. 5. In the present embodiment, as depicted in FIG. 8A, the angle $\phi'$, for example, shall mean an angle in which a counterclockwise direction of the X-axis positive direction with respect to the X-axis positive direction in the initial state when viewed from the Z-axis positive direction in the initial state is set as being positive. In addition, in the present embodiment, as depicted in FIG. 8B, the angle $\theta'$, for example, shall mean an angle in which a counterclockwise direction of the X-axis positive direction with respect to the X-axis positive direction in the initial state when viewed from the Y-axis positive direction in the initial state is set as being positive. It should be noted that in the present embodiment, $-180<\phi'\leq+180$, and $-90\leq\theta'\leq+90$ shall be established. Incidentally, the values ($\phi'$, $\theta'$) of the posture angle parameters in the state of (A) of FIG. 5 becomes (0, 0). In addition, the values ($\phi'$, $\theta'$) of the posture angle parameters in the state of (B) of FIG. 5 becomes (+90, 0). In addition, the values ($\phi'$, $\theta'$) of the posture angle parameters in the state of (C) of FIG. 5 becomes (+180, 0). In addition, the values ($\phi'$, $\theta'$) of the posture angle parameters in the state of (D) of FIG. 5 becomes (−90, 0).

The narrowing area specifying portion 54, in the present embodiment, for example, specifies the narrowing area R based on the posture of the HMD 12 specified by the posture specifying portion 52. The narrowing area specifying portion 54, in the present embodiment, for example, specifies the main beam angle parameters ($\phi$, $\theta$) corresponding to the coordinate values of a center point of the narrowing area R. Hereinafter, the main beam angle parameters ($\phi$, $\theta$) corresponding to the coordinate values of the center point of the narrowing area R will be referred to as main beam center angle parameters ($\phi c$, $\theta c$). In the present embodiment, for example, a relationship between the values ($\phi c$, $\theta c$) of the main beam center angle parameters, and the posture angle parameters ($\phi'$, $\theta'$) is expressed by an expression of ($\phi c$, $\theta c$)=($-\phi'$, $90-\theta'$). For this reason, in the present embodiment, $-180<\phi c\leq+180$, and $0\leq\theta c+180$ are established.

The secondary candidate sector selecting portion 56 selects the secondary candidate sectors from the primary candidate sectors exhibited by the primary candidate sector data. The secondary candidate sector selecting portion 56, in the present embodiment, for example, selects the primary candidate sector data corresponding to the range of the angle within the narrowing area R specified by the narrowing area specifying portion 54 as the secondary candidate sector data exhibiting the secondary candidate sectors. More specifically, for example, the primary candidate sector data in which the main beam angle parameters ($\phi$, $\theta$) meeting a condition of $((\phi-\phi c)^2+(\theta-\theta c)^2))^{1/2}\leq 40$ is contained is selected as the secondary candidate sector data exhibiting the secondary candidate sectors. The secondary candidate sector selecting portion 56 may select the primary candidate sectors in which the corresponding angles fall within the range of the angle responding to the posture of the HMD 12 as the secondary candidate sectors in such a manner. It should be noted that in the processing for selecting the secondary candidates by the secondary candidate sector selecting portion 56, the communication (negotiation) between the HMD 12 and the relay device 16 is unnecessary.

The sector level sweep processing executing portion 58, in the present embodiment, for example, determines the main beam direction of the HMD 12 based on the communication qualities when there are carried out the communications in which the respective secondary candidate sectors selected by the secondary candidate sector selecting portion 56 are set as the main beam directions. The sector level sweep processing executing portion 58 shall play a role as the main beam direction determining portion for determining the main beam direction of the HMD 12 based on the communication qualities when there are individually carried out the communications by the secondary candidates from the secondary candidates. In the present embodiment, for example, the sector level sweep processing executing portion 58 confirms the communication qualities in the communications in which the respective secondary candidate sectors selected by the secondary candidate sector selecting portion 56 are decided as the main beam directions, in the negotiation between the HMD 12 and the relay device 16. Then, the sector level sweep processing executing portion 58, for example, determines the main beam direction in which the highest communication quality is obtained as the main beam direction of the HMD 12.

The beam refinement processing executing portion 60 executes the beam refinement processing for finely adjusting the main beam direction determined by the sector level sweep processing executing portion 58. The beam refinement processing is also executed by the communication (negotiation) between the HMD 12 and the relay device 16.

Figure 9:
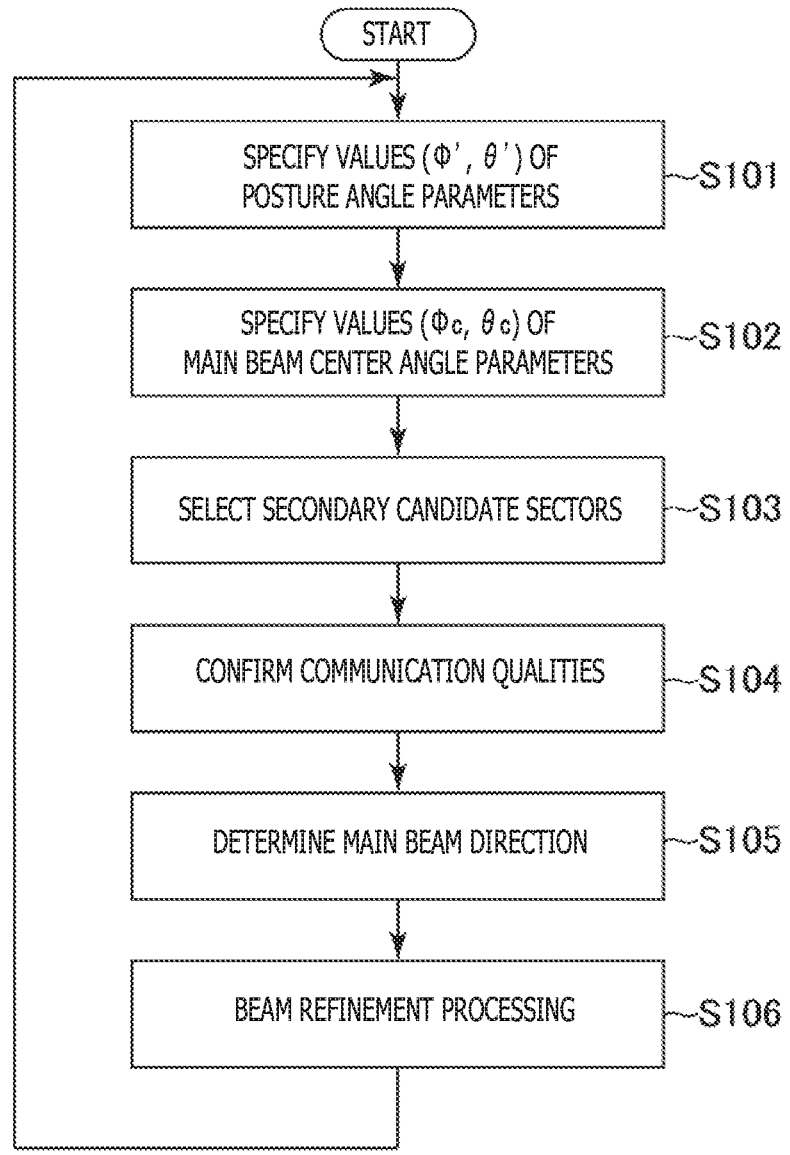
FIG. 9 is a flow chart depicting an example of a flow of pieces of processing which are executed in the head-mounted display according to the embodiment of the present invention.

Hereinafter, an example of a flow of the processing executed by the HMD 12 according to the present embodiment will be described with reference to a flow chart depicted in FIG. 9. In the following processing example, for example, in the initial state, as depicted in (A) of FIG. 5, the user mounting thereto the HMD 12 shall face the horizontal direction, and shall also face the relay device 16 as the party of the communication.

Firstly, the posture specifying portion 52 specifies the values ($\phi'$, $\theta'$) of the posture angle parameters exhibiting the posture of the HMD 12 (S101).

Then, the narrowing area specifying portion 54 specifies the values ($\phi c$, $\theta c$) of the main beam center angle parameters made to correspond to the values ($\phi'$, $\theta'$) of the posture angle parameters specified in the processing depicted in S101 (S102). In this case, for example, the values ($-\phi'$, $90-\theta'$) are specified as the values ($\phi c$, $\theta c$) of the main beam center angle parameters.

Then, the secondary candidate sector selecting portion 56 selects the primary candidate sectors within the narrowing area R as the secondary candidate sectors (S103). In this case, for example, the primary candidate sector data in which the main beam angle parameters ($\phi$, $\theta$) meeting the condition of $((\phi-\phi c)^2+(\theta-\theta c)^2))^{1/2}\leq 40$ is contained is selected as the secondary candidate sector data exhibiting the secondary candidate sectors.

Then, the sector level sweep processing executing portion 58 confirms the communication qualities during the communication in the main beam directions exhibited by the secondary candidate sectors with respect to all the secondary candidate sectors specified in the processing depicted in S103 (S104).

Then, the sector level sweep processing executing portion 58 determines the main beam direction exhibited by the secondary candidate sector the communication quality of which is specified as being highest in the processing depicted in S104 as the main beam direction of the HMD 12 (S105).

Then, the beam refinement processing executing portion 60 executes the beam refinement processing as the fine adjustment of the main beam direction determined in the processing depicted in S105 (S106).

Then, the processing returns back to the processing depicted in S101. Subsequently, the pieces of processing S101 to S106 are repetitively executed. It should be noted that as described above, in the pieces of processing depicted in S101 to S103, the negotiation between the HMD 12 and the relay device 16 is not carried out, but in the pieces of processing depicted in S104 to S106, the negotiation between the HMD 12 and the relay device 16 is carried out.

It should be noted that the present invention is by no means limited to the present embodiment described above.

For example, when the quality of the communication between the HMD 12 and the relay device 16 becomes equal to or lower than a predetermined quality, the pieces of processing depicted in S101 to S106 described above may be executed. In addition, the pieces of processing depicted in S101 to S106 described above may be executed at predetermined time intervals.

In addition, in the case where even if the processing depicted in S106 described above is ended, the quality of the communication between the HMD 12 and the relay device 16 does not reach the predetermined quality, with respect to all the primary candidate sectors, the communication qualities during the communications in the main beam directions exhibited by the primary candidate sectors concerned may be confirmed. Then, in this case, the HMD 12 may determine the main beam direction exhibited by the primary candidate sector the communication quality of which is specified as being highest as the main beam direction of the HMD 12. In addition, in this case, for example, the primary candidate sector which is not selected as the secondary candidate sector may be present.

In addition, for example, the radius of the narrowing area R may not have the length corresponding to 40 degrees. In addition, the narrowing area R does not need to have the circular shape.

In addition, for example, a part of or all of the functions exemplified in FIG. 6 may be mounted to the entertainment device 14. In addition, the posture specifying portion 52 described above, for example, may acquire the image captured by the camera 20a, and may specify the posture of the HMD 12 based on the image concerned.

In addition, the concrete character strings and numerical values described above, and the concrete character strings and numerical values in the drawings are merely exemplifications, and the present invention is by no means limited these character strings and numerical values.

The invention claimed is:

1. A main beam direction determining device for determining a main beam direction of a head-mounted display from a plurality of primary candidate directions of the main beam direction, the main beam direction determining device comprising:
   a selection portion configured to select, from the plurality of primary candidate directions, one or more of the plurality of primary candidate directions as secondary candidate directions of the main beam direction, in response to a posture of the head-mounted display; and
   a main beam direction determining portion configured to determine the main beam direction of the head-mounted display based on which of a plurality of wireless communications between the head-mounted display and a receiver is of the highest communication quality, each of the plurality of wireless communications being along a direction associated with a respective one of the secondary candidate directions, each of the associated secondary candidate directions being different from one another.

2. The main beam direction determining device according to claim 1, further comprising:
   a posture specifying portion configured to specify a posture of the head-mounted display based on a detection result of a sensor, the head-mounted display being provided with the sensor,
   wherein the selection portion selects the one or more of the plurality of primary candidate directions in response to the posture specified by the posture specifying portion as the secondary candidate directions.

3. The main beam direction determining device according to claim 1, wherein
   the primary candidate directions are made to correspond to angles with respect to a direction of a reference, and
   the selection portion selects the primary candidate directions in which the angles made to correspond thereto fall within a range of an angle responding to the posture of the head-mounted display as the secondary candidate directions.

4. A head-mounted display for determining a main beam direction of a head-mounted display from a plurality of primary candidate directions of the main beam direction, the head-mounted display comprising:
   a selection portion configured to select, from the plurality of primary candidate directions, one or more of the plurality of primary candidate directions as secondary candidate directions of the main beam direction, in response to a posture of the head-mounted display; and
   a main beam direction determining portion configured to determine the main beam direction of the head-mounted display based on which of a plurality of wireless communications between the head-mounted display and a receiver is of the highest communication quality, each of the plurality of wireless communications being along a direction associated with a respective one of the secondary candidate directions, each of the associated secondary candidate directions being different from one another.

5. A main beam direction determining method of determining a main beam direction of a head-mounted display from a plurality of primary candidate directions of the main beam direction, the main beam direction determining method comprising:
   selecting, from the plurality of primary candidate directions, one or more of the plurality of primary candidate directions as secondary candidate directions of the main beam direction, in response to a posture of the head-mounted display; and
   determining the main beam direction of the head-mounted display based on which of a plurality of wireless communications between the head-mounted display and a receiver is of the highest communication quality, each of the plurality of wireless communications being along a direction associated with a respective one of the secondary candidate directions, each of the associated secondary candidate directions being different from one another.

* * * * *